US012721765B2

(12) United States Patent
Li et al.

(10) Patent No.: US 12,721,765 B2
(45) Date of Patent: Sep. 1, 2026

(54) COLLAPSIBLE WHEELCHAIR

(71) Applicant: Shanghai Bangbang Robotics Co., Ltd, Shanghai (CN)

(72) Inventors: Jianguo Li, Shanghai (CN); Jie Liu, Shanghai (CN); Xiaodong Wang, Shanghai (CN); Hengjie Tang, Shanghai (CN); Canfeng Liu, Shanghai (CN); Zhefu Zhang, Shanghai (CN); Bofeng Liu, Shanghai (CN); Shiwei Jiang, Shanghai (CN)

(73) Assignee: Shanghai Bangbang Robotics Co., Ltd, Shanghai (CN)

( * ) Notice: Subject to any disclaimer, the term of this patent is extended or adjusted under 35 U.S.C. 154(b) by 253 days.

(21) Appl. No.: 18/659,893

(22) Filed: May 9, 2024

(65) Prior Publication Data

US 2024/0293275 A1 Sep. 5, 2024

Related U.S. Application Data

(63) Continuation of application No. PCT/CN2022/107693, filed on Jul. 25, 2022.

(51) Int. Cl.

| | |
|---|---|
| ***A61G 5/08*** | (2006.01) |
| ***A61G 5/10*** | (2006.01) |
| ***A61G 5/12*** | (2006.01) |

(52) U.S. Cl.

CPC .......... *A61G 5/0866* (2016.11); *A61G 5/0808* (2016.11); *A61G 5/0883* (2016.11); *A61G 5/1048* (2016.11); *A61G 5/128* (2016.11)

(58) Field of Classification Search

CPC ............................ A61G 5/0866; A61G 5/0808

See application file for complete search history.

(56) References Cited

U.S. PATENT DOCUMENTS

| | | | | |
|---|---|---|---|---|
| 6,164,674 A * | 12/2000 | Rogers | A61G 5/1054 | 280/42 |
| 2008/0111341 A1* | 5/2008 | Borisoff | A61G 5/1054 | 280/250.1 |
| 2020/0289350 A1* | 9/2020 | Silveira | A61G 5/1075 | |
| 2021/0038451 A1* | 2/2021 | Wang | A61G 5/128 | |

(Continued)

FOREIGN PATENT DOCUMENTS

| | | |
|---|---|---|
| CA | 2133628 A1 | 4/1995 |
| CN | 105167928 A | 12/2015 |

(Continued)

OTHER PUBLICATIONS

International Search Report dated Dec. 28, 2022 for International Application No. PCT/CN2022/107693.

(Continued)

*Primary Examiner* — Brian L Swenson

(57) ABSTRACT

A collapsible wheelchair, including a front support frame, a backrest bracket, a rear support frame and a bracket connecting rod, which are hinged with each other to form a first connecting rod mechanism; the seat connecting rod is hinged with the front support frame and a seat bracket respectively; the front support frame, the backrest bracket, the seat bracket and the seat connecting rod form a second connecting rod mechanism; a hinge point of the backrest bracket and the seat bracket is located above a central plane of the seat bracket.

16 Claims, 6 Drawing Sheets

(56) References Cited

U.S. PATENT DOCUMENTS

| | | | | |
|---|---|---|---|---|
| 2021/0212871 | A1* | 7/2021 | Klein | A61G 5/1048 |
| 2021/0290460 | A1* | 9/2021 | Dai | A61G 5/0833 |
| 2023/0201053 | A1* | 6/2023 | Pfeiffer | B60B 33/025<br>280/650 |
| 2024/0293275 | A1* | 9/2024 | Li | A61G 5/1048 |

FOREIGN PATENT DOCUMENTS

| | | | |
|---|---|---|---|
| CN | 105769464 | A | 7/2016 |
| CN | 106074028 | A | 11/2016 |
| CN | 107049639 | A | 8/2017 |
| CN | 206630790 | U | 11/2017 |
| CN | 108078697 | A | 5/2018 |
| CN | 207860015 | U | 9/2018 |
| CN | 109199721 | A | 1/2019 |
| CN | 109568039 | A | 4/2019 |
| CN | 209091918 | U | 7/2019 |
| CN | 110179602 | A | 8/2019 |
| CN | 111449861 | A | 7/2020 |
| CN | 111671584 | A | 9/2020 |
| CN | 212816829 | U | 3/2021 |
| CN | 112674953 | A | 4/2021 |
| CN | 214318344 | U | 10/2021 |
| CN | 214549884 | U | 11/2021 |
| DE | 202017006531 | U1 | 4/2018 |
| KR | 20180052046 | A | 5/2018 |

OTHER PUBLICATIONS

First Office Action for China Patent Application No. 202310376646.9, dated May 28, 2025.

Extended European Search Report dated Jan. 28, 2025 for European Application No. 22952209.9.

The First Office Action dated Feb. 7, 2025 for Chinese Application No. 202280002585.3.

* cited by examiner

COLLAPSIBLE WHEELCHAIR

CROSS-REFERENCE TO RELATED APPLICATION

This application is a continuation of International Application No. PCT/CN2022/107693, filed on Jul. 25, 2022, the disclosure of which is hereby incorporated by reference in its entirety.

TECHNICAL FIELD

The present application relates to the technical field of medical instruments, and more specifically, to a collapsible wheelchair.

BACKGROUND

Collapsible wheelchairs are means of transportation for special populations such as the disabled, the elderly and infirm, and medical and clinical rehabilitation patients. The collapsible wheelchairs are widely used since they are foldable, easy to carry and have small space occupation.

The existing collapsible wheelchair includes a front support frame, a backrest bracket, a rear support frame, a bracket connecting rod, a seat bracket, and a seat connecting rod. Among them, the front support frame, the backrest bracket, the rear support frame, and the bracket connecting rod are hinged together to form a first connecting rod mechanism which is foldable and deformable, so as to achieve the folding of the front support frame, the backrest bracket, and the rear support frame.

The front support frame, the seat connecting rod, the seat bracket and the backrest bracket as mentioned above form a second connecting rod mechanism which is foldable and deformable. When the first connecting rod mechanism moves, the second connecting rod mechanism can move accordingly, thereby realizing that the seat bracket can be folded accordingly during the folding and unfolding process of the collapsible wheelchair. However, the folding space between the backrest bracket and the seat bracket of the collapsible wheelchair mentioned above is small, and the backrest cushion and/or the seat cushion need to be removed at the time of folding, making the folding process cumbersome and resulting in poor user experience.

SUMMARY

The objective of the present application is to provide a collapsible wheelchair, capable of solving the problem that the collapsible wheelchair is easy to tilt after folding, and improving the user experience.

In order to achieve the above objective, the embodiments of the present application provide the following technical solution.

The embodiment of the present application provides a collapsible wheelchair including a front support frame, a backrest bracket, a rear support frame, a bracket connecting rod, a seat bracket and a seat connecting rod; where the front support frame, the backrest bracket, the rear support frame and the bracket connecting rod are hinged with each other to form a first connecting rod mechanism; the seat connecting rod is hinged with the front support frame and the seat bracket respectively; and the front support frame, the backrest bracket, the seat bracket and the seat connecting rod form a second connecting rod mechanism; a hinge point of the backrest bracket and the seat bracket is located above a central plane of the seat bracket.

In a possible implementation, the front support frame, the backrest bracket, the rear support frame and the bracket connecting rod of the first connecting rod mechanism are hinged in turn to form pivot points a, b, c and d, and a distance relationship among the pivot points satisfies: ab:bc:cd:da=1:1.1~1.2:2.4~3:2.4~2.8; the front support frame, the seat connecting rod, the seat bracket and the backrest bracket of the second connecting rod mechanism are connected in turn to form pivot points e, f, g and a, and the pivot point g is located above the central plane of the seat bracket; a distance relationship among the pivot points satisfies: ef:fg:ga:ae=1~1.8:2.8~4.8:1:2.2~3.2.

In a possible implementation, in the first connecting rod mechanism, the distance relationship among the pivot points satisfies: ab:bc:cd:da=1:1.2:2.75:2.7; and/or in the second connecting rod mechanism, the distance relationship among the pivot points satisfies: ef:fg:ga:ae=1.65:4.7:1:3.1.

In a possible implementation, the backrest bracket is provided with a first installation portion configured to install a backrest cushion, and the first installation portion is inclined backwards along a first direction.

In a possible implementation, a vertical distance between the pivot point g and the central plane of the seat bracket is X, and a vertical distance between the pivot point g and a central plane of the first installation portion is Y, and X and Y satisfy that 60 mm≤X+Y≤110 mm.

In a possible implementation, the seat bracket is obliquely arranged relative to a support plane of a wheel set supporting the collapsible wheelchair, and an end of the seat bracket away from the pivot point g is inclined upwards; the seat bracket is configured such that the seat bracket is rotatable counterclockwise when the first installation portion rotates counterclockwise to fold the collapsible wheelchair; and when the collapsible wheelchair is in a folded state, the central plane of the seat bracket is parallel to the support plane.

In a possible implementation, an angle range of a back inclination angle of the first installation portion is 5°~20°; an angle range of an inclination angle of the seat bracket is 2°~8°.

In a possible implementation, the collapsible wheelchair includes front wheels, rear wheels and a support wheel; the front wheels are installed on the front support frame, and the rear wheels are installed on the rear support frame; the bracket connecting rod includes a main body section and an extension section, where the main body section is arranged between the rear support frame and the front support frame, and the extension section is arranged laterally of the rear support frame; the extension section is obliquely arranged downwards, and an included angle between the extension section and the main body section is an obtuse angle; the support wheel is arranged at one end of the extension section away from the main body section, and the support wheel is configured such that when the collapsible wheelchair is in a folded state, both the support wheel and the rear wheels abut against the support plane.

In a possible implementation, the collapsible wheelchair includes front wheels and rear wheels; the front wheels are installed on the front support frame, and the rear wheels are installed on the rear support frame; the bracket connecting rod includes a main body section, where the main body section is arranged between the rear support frame and the front support frame, and the main body section is respectively hinged with the rear support frame and the front support frame.

In a possible implementation, the collapsible wheelchair further includes a support wheel; the bracket connecting rod further includes an extension section, and the extension section is arranged outside the rear support frame; the extension section is obliquely arranged downwards, and an included angle between the extension section and the main body section is an obtuse angle; the support wheel is arranged at an end of the extension section far away from the main body section, and when the support wheel is configured such that the collapsible wheelchair is in a folded state and placed horizontally, both the support wheel and the rear wheels abut against the support plane; and when the support wheel is configured such that the collapsible wheelchair is in a folded state and is arranged perpendicular to the support plane, the support wheel, a part of the backrest bracket near the pivot point b and/or a part of the rear support frame near the pivot point b respectively abut against the support plane.

In a possible implementation, the collapsible wheelchair includes a footrest, the footrest is arranged on the front support frame, and the footrest is configured to be foldable relative to the front support frame; the footrest has a through hole penetrating therethrough to form a first grip portion, and when unfolding or folding the collapsible wheelchair, the first grip portion is configured as a force applying portion.

In a possible implementation, a side of the front support frame close to the footrest is provided with a U-shaped recessed portion; the footrest includes a support portion and a connection portion which are arranged in an L-shape, the connection portion is rotatably connected in the recessed portion, and the through hole penetrates through the support portion.

In a possible implementation, a back side of the backrest bracket is provided with a grasping arm, two ends of the grasping arm are respectively connected with the back side of the backrest bracket, and a second grip portion is formed between the grasping arm and the backrest bracket; when unfolding or folding the collapsible wheelchair, the second grip portion is configured as a force applying portion; and when the collapsible wheelchair is in a folded state, the second grip portion and the first grip portion approach each other.

In a possible implementation, the collapsible wheelchair further includes a locking hook mechanism; the locking hook mechanism includes a linkage rod and at least one locking hook, and the locking hook is arranged at an end of the linkage rod; the locking hook is rotatably connected to the backrest bracket, and a torsion spring is arranged between the locking hook and the backrest bracket, and the torsion spring is configured to provide a locking force to the locking hook; the rear support frame is provided with a retaining pin matched with the locking hook, and the locking hook is provided with a limiting groove matched with the retaining pin, and the locking hook is clamped to the retaining pin through the limiting groove.

In a possible implementation, the locking hook mechanism includes two locking hooks, and the two locking hooks are symmetrically arranged at either ends of the linkage rod; the locking hook is provided with a wrench, and the backrest bracket is provided with a positioning protrusion, and the wrench is configured such that when the wrench abuts against the positioning protrusion, the limiting groove of the locking hook is clamped to the retaining pin.

Compared with related arts, the collapsible wheelchair provided in the embodiments of the present application has the following advantages.

In the collapsible wheelchair according to an embodiment of the present application, a hinge point between the backrest bracket and the seat bracket is located above the central plane of the seat bracket, so that there is a large folding space between the backrest bracket and the seat bracket. Therefore, when folding the collapsible wheelchair, there will be no interference between the backrest bracket and the seat bracket, and there is no need to dismantle the backrest cushion installed on the backrest bracket and/or the seat cushion installed on the seat bracket in advance.

Compared with the solution in the related arts that the backrest bracket and the seat bracket of the collapsible wheelchair have, formed therebetween, a hinge point which is located below the central plane of the seat bracket, thereby resulting in a necessity to remove the seat cushion and/or the backrest cushion of the collapsible wheelchair in advance, for the collapsible wheelchair in the embodiment of the present application, there is no need to dismantle the backrest cushion and/or the seat cushion in advance at the time of folding, thereby simplifying the folding process and improving the user experience.

In addition to the technical problems solved by the embodiments of the present application as described above, the technical features constituting the technical solutions, and the beneficial effects brought by the technical features of these technical solutions, other technical problems that the collapsible wheelchair according to the disclosed embodiments can solve, other technical features included in the technical solutions, and the beneficial effects brought by these technical features will be further explained in detail in the specific embodiments.

REFERENCE SIGNS

Figure 1:
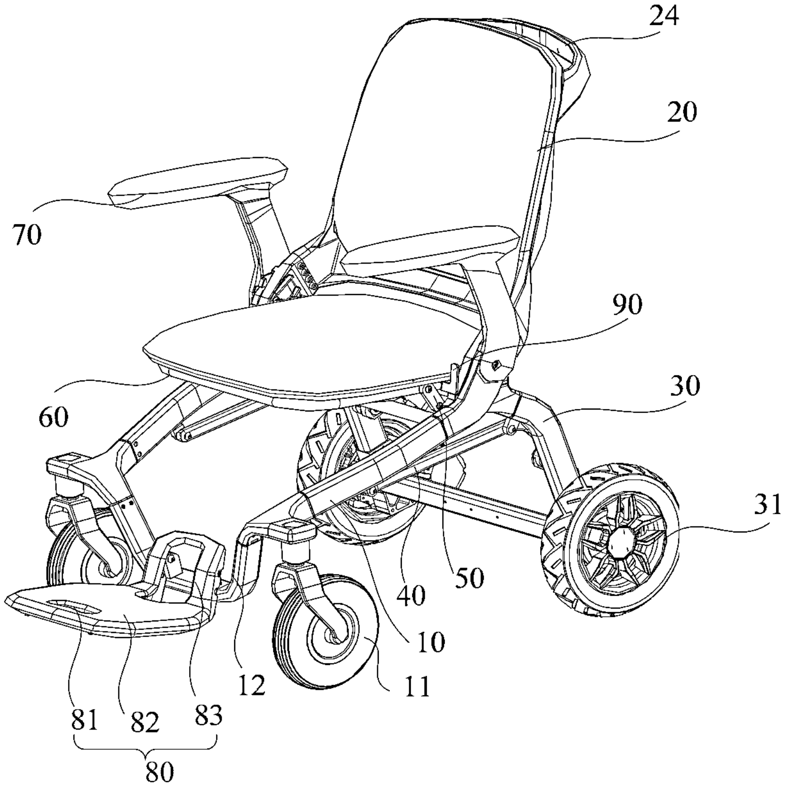
FIG. 1 is a schematic diagram of an overall structure of the collapsible wheelchair provided by an embodiment of the present application.

10—Front support frame; 11—Front wheel; 12—Recessed portion; 20—Backrest bracket; 21—First locking surface; 22—First installation portion; 23—Second installation portion; 24—Grasping arm; 30—Rear support frame; 31—Rear wheel; 32—Second locking surface; 33—Retaining pin; 40—Bracket connecting rod; 41—Support wheel; 42—Main body section; 43—Extension section; 50—Seat connecting rod; 60—Seat bracket; 70—Armrest; 80—Footrest; 81—Through hole; 82—Support portion; 83—Connection portion; 90—Locking hook mechanism; 91—Linkage rod; 92—Locking hook; 921 Wrench; 922—Limiting groove; 93—Torsion spring

DESCRIPTION OF EMBODIMENTS

As described in the background technology, the related arts present the technical problem that there is a need to remove the backrest cushion and/or the seat cushion when folding the collapsible wheelchair, thus the folding process is cumbersome, leading to poor user experience. According to the inventors' research, the reason for this problem is that the collapsible wheelchair includes a foldable and deformable first connecting rod mechanism formed by a front support frame, a backrest bracket, a rear support frame and a bracket connecting rod which are hinged together and a foldable and deformable second connecting rod mechanism formed by the front support frame, a seat connecting rod, a seat bracket and the backrest bracket; when the first connecting rod mechanism moves, the second connecting rod mechanism can move accordingly, thereby realizing that the seat bracket can be folded accordingly during the folding and unfolding process of the collapsible wheelchair.

However, a hinge point formed by the above-mentioned seat bracket and backrest bracket is located below the seat bracket, and the folding space between the backrest bracket and the seat bracket is relatively small. If the backrest cushion installed on the backrest bracket and/or the seat cushion installed on the seat bracket are not removed in advance, the backrest bracket and the seat bracket will interfere during folding, which prevents the collapsible wheelchair from being folded. Therefore, before folding the collapsible wheelchair, the backrest cushion and/or the seat cushion need to be removed in advance.

In response to the above-mentioned technical problems, the embodiment of the present embodiment provides a collapsible wheelchair. The hinge point between the backrest bracket and the seat bracket is positioned above the central plane of the seat bracket, so that the folding space between the backrest bracket and the seat bracket is relatively large. Therefore, when folding the collapsible wheelchair, there will be no interference between the backrest bracket and the seat bracket, and there is no need to remove the backrest cushion installed on the backrest bracket and/or the seat cushion installed on the seat bracket in advance. As such, the folding process is simplified and the user experience is improved.

In order to make the above objectives, features, and advantages of the embodiments of the present application more obvious and understandable, the following will provide a clear and complete description of the technical solution in the embodiments of the present application with reference to the accompanying drawings. Obviously, the described embodiments are only part of the embodiments of the present application, not all embodiments. Based on the embodiments in the present application, all other embodiments obtained by those ordinarily skilled in the art without creative labor shall fall within the scope of protection of the present application.

For the convenience of understanding the embodiments of the present application, the lines shown in the schematic diagrams of the mechanisms involved in the embodiments of the present application are projections of the central plane of each specific structure in the frontal direction. The first direction involved in the present application is indicated by the arrow shown in FIG. 5, the first direction represents the front-rear direction of the entire collapsible wheelchair.

As shown in FIGS. 1 to 5, the collapsible wheelchair provided by an embodiment of the present application includes a front support frame 10, a backrest bracket 20, an armrest 70, front wheels 11, rear wheels 31, a rear support frame 30, a bracket connecting rod 40, a seat bracket 60, a seat connecting rod 50, and a footrest 80; where the front support frame 10, the backrest bracket 20, the rear support frame 30, and the bracket connecting rod 40 are hinged together, forming a first connecting rod mechanism which is foldable and deformable.

The front support frame 10, the backrest bracket 20, the seat bracket 60, and the seat connecting rod 50 are hinged together, forming a second connecting rod mechanism which is foldable and deformable, and the second connecting rod mechanism is linked with the first connecting rod mechanism to achieve the follower folding or unfolding of the seat bracket 60 during an unfolding process or a folding process of the whole collapsible wheelchair.

The armrests 70 on either sides of the backrest bracket 20 can rotate relative to the backrest bracket 20. For example, the armrest 70 can be rotatably connected to the backrest bracket 20, or the armrest 70 can be rotatably connected to the front support frame 10, and the front support frame 10 can be rotatably connected to the backrest bracket 20. When folding the wheelchair up and down, a user can lift the armrest 70 upwards for the convenience of seating; and when the user is seating in the collapsible wheelchair, the armrest 70 can provide support for the user, to improve the user experience.

Specifically, the collapsible wheelchair is typically provided with a wheel set configured to support the collapsible wheelchair and drive the movement of the collapsible wheelchair. The wheel set includes the front wheels 11 and the rear wheels 31, and when the collapsible wheelchair is in a folded state, the front wheels 11 and the rear wheels 31 can come into contact with the ground and a horizontal support plane is formed, and the support plane supports the entire collapsible wheelchair. It should be understood that the support plane is arranged parallel to the ground, which can be regarded as a part of the ground between portions at which the front wheels 11 contact with the ground and the rear wheels 31 contact with the ground. The front support frame 10, which is also referred to as a front wheel bracket, is configured to install the front wheels 11. The footrest 80 is also installed at the front end of the front support frame 10 to provide foot support for the user. The rear support frame 30, which is also referred to as a rear wheel bracket, is configured to install the rear wheels 31.

Figure 6:
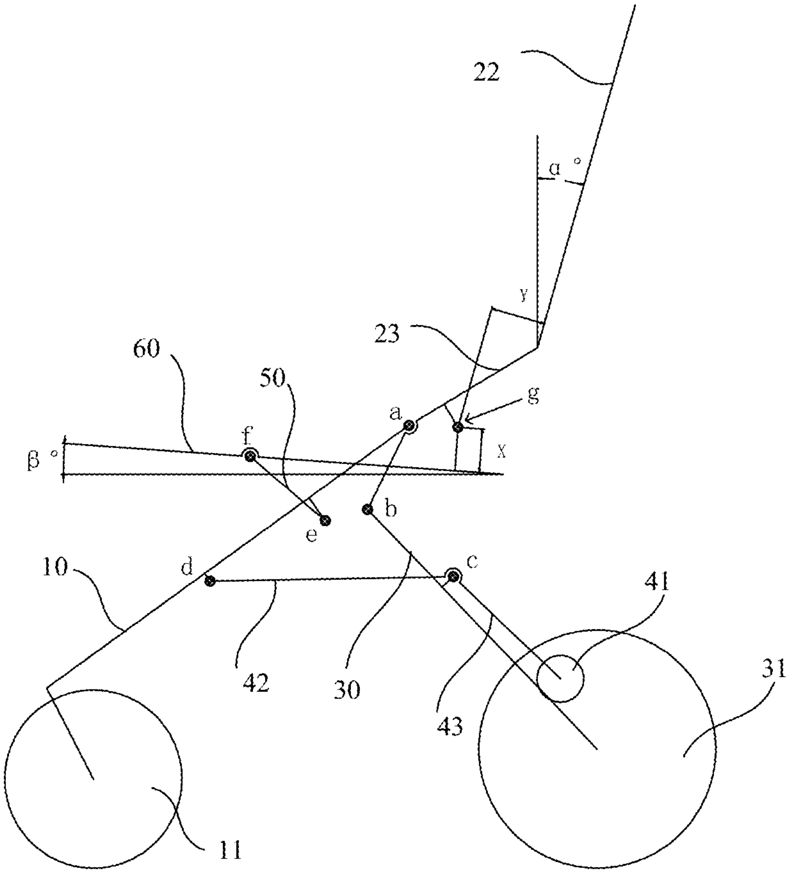
FIG. 6 is a positional schematic diagram of a pivot point g provided by an embodiment of the present application.

As shown in FIG. 6, the backrest bracket 20 includes a first installation portion 22 and a second installation portion 23, and the first installation portion 22 is configured to install a backrest cushion of the collapsible wheelchair. The second installation portion 23 is configured for connection with the front support frame 10, the seat bracket 60, and the rear support frame 30, and an end of the front support frame 10 away from the front wheels 11 and an end of the rear support frame 30 away from the rear wheels 31 are respectively rotatably connected to the second installation portion 23 of the backrest bracket 20, and can rotate relative to the backrest bracket 20.

The bracket connecting rod 40 is arranged between the rear support frame 30 and the front support frame 10. The two ends of the bracket connecting rod 40 are respectively hinged with the rear support frame 30 and the front support frame 10. That is, the front support frame 10, the backrest bracket 20, the rear support frame 30, and the bracket connecting rod 40 are rotatably connected with each other to form pivot points a, b, c, and d, so that a first connecting rod mechanism which is foldable and deformable is formed, to achieve the folding of the front support frame 10, the rear support frame 30, and the backrest bracket 20 of the collapsible wheelchair. When the collapsible wheelchair is in an unfolded state, the backrest bracket 20 and the rear support frame 30 are mutually limited and supported, thereby forming a stable triangular structure of the pivot points a, c, and d.

The above-mentioned seat connecting rod 50 is configured to connect the seat bracket 60 and the front support frame 10. One end of the seat connecting rod 50 is hinged with the seat bracket 60, and the other end of the seat connecting rod 50 is hinged with the front support frame 10. That is, the front support frame 10, the seat connecting rod 50, the seat bracket 60, and the backrest bracket 20 are hinged with each other to form pivot points e, f, g and a, so that a second connecting rod mechanism which is foldable and deformable is formed, to achieve the follower folding of the seat bracket 60 during the folding and unfolding process of the entire collapsible wheelchair.

Furthermore, in an embodiment of the present application, the pivot point g formed by the backrest bracket 20 and the seat bracket 60 is located above a central plane of the seat bracket 60. This arrangement allows for a relatively large folding space between the backrest bracket 20 and the seat bracket 60. Therefore, when folding the collapsible wheelchair, there will be no interference between the backrest bracket 20 and the seat bracket 60, and there is no need to dismantle the backrest cushion installed on the backrest bracket 20 and/or the seat cushion installed on the seat bracket 60 in advance.

Compared with the solution in the prior art that the backrest bracket and the seat bracket have, formed therebetween, a hinge point which is located below the central plane of the seat bracket, resulting in a necessity to remove the seat cushion and/or the backrest cushion of the collapsible wheelchair in advance at the time of folding, for the collapsible wheelchair in the embodiment of the present application, there is no need to dismantle the backrest cushion and/or the seat cushion in advance at the time of folding, thereby simplifying the folding process and improving the user experience.

Figure 5:
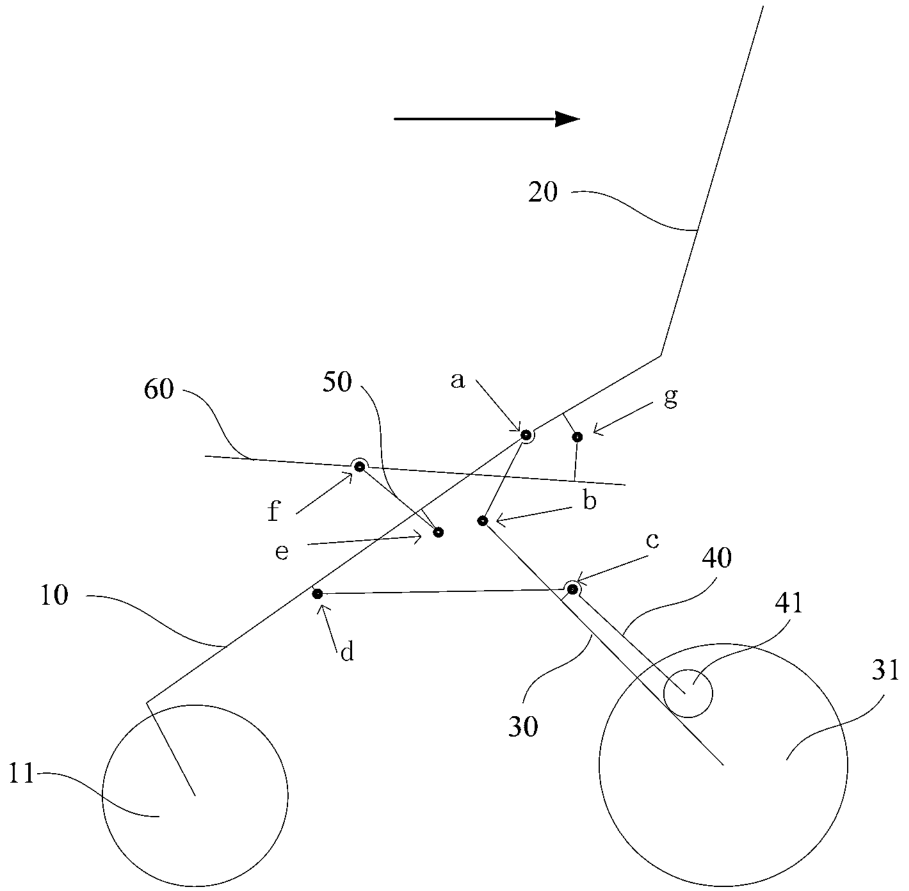
FIG. 5 is a structural schematic diagram of the collapsible wheelchair in an unfolded state provided by an embodiment of the present application.
Figure 7:
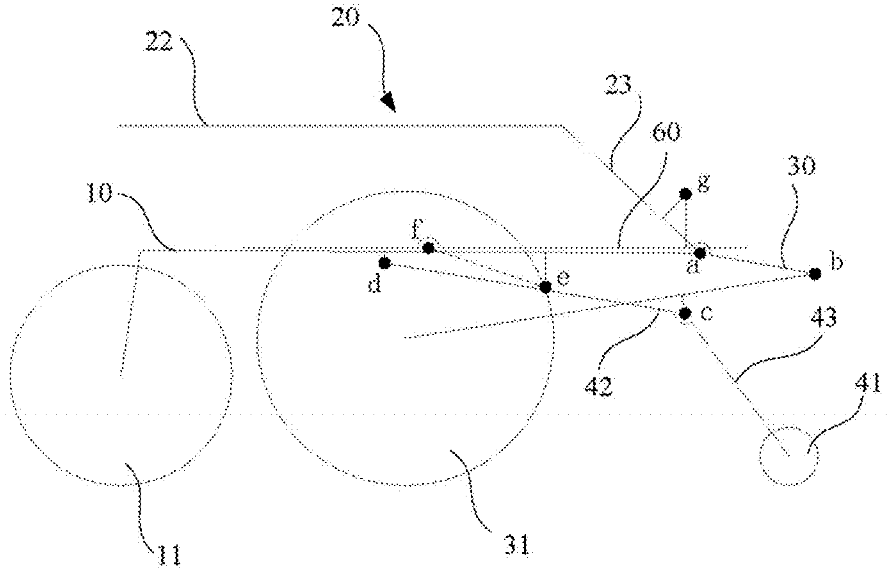
FIG. 7 is a structural schematic diagram of the collapsible wheelchair in a folded state provided by an embodiment of the present application.
Figure 8:
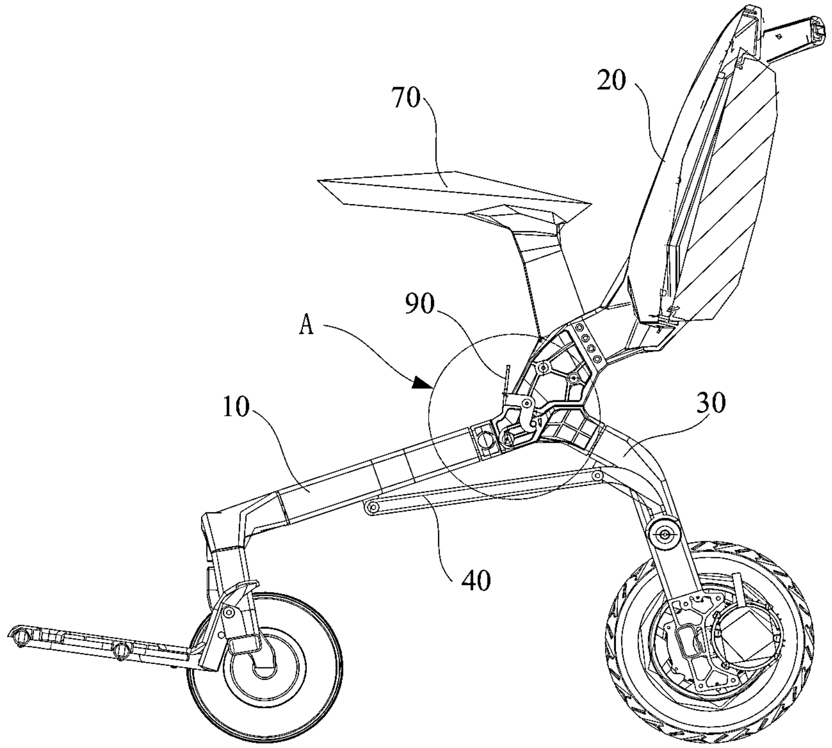
FIG. 8 is a schematic diagram of the arrangement of the locking hook mechanism and the locking structure provided by an embodiment of the present application.
Figure 9:
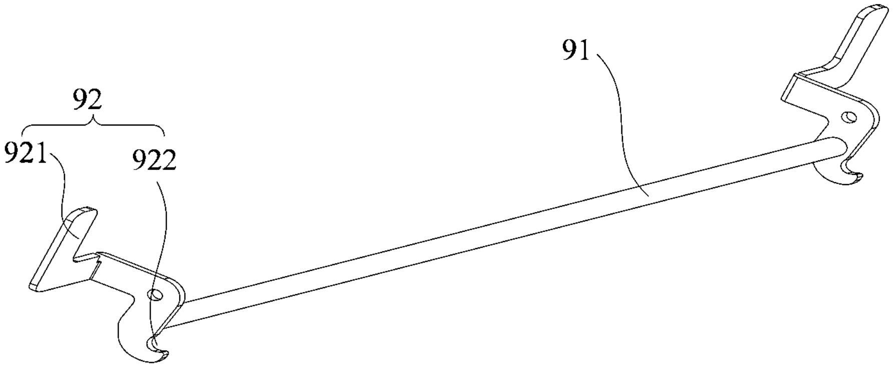
FIG. 9 is a schematic diagram illustrating connection between the linkage rod and the locking hook in the locking hook mechanism provided by an embodiment of the present application.
Figure 10:
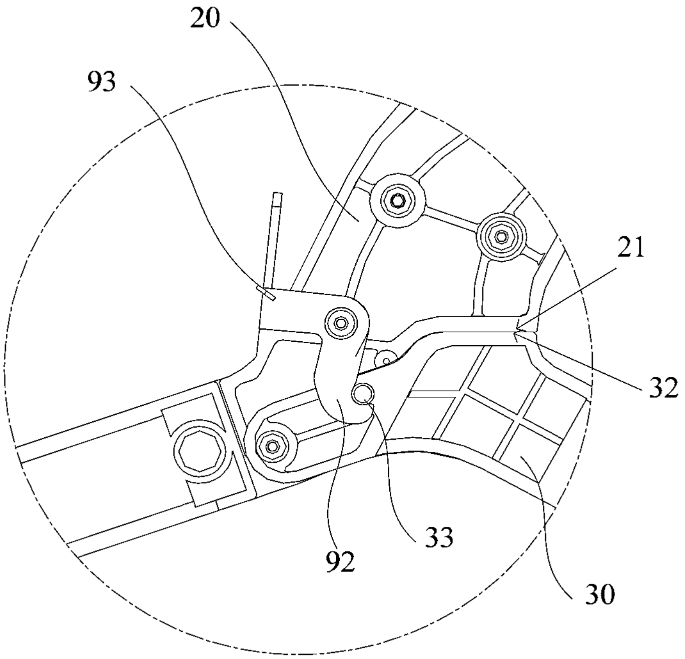
FIG. 10 is an enlarged schematic diagram of a view angle at position A in FIG. 8.
Figure 11:
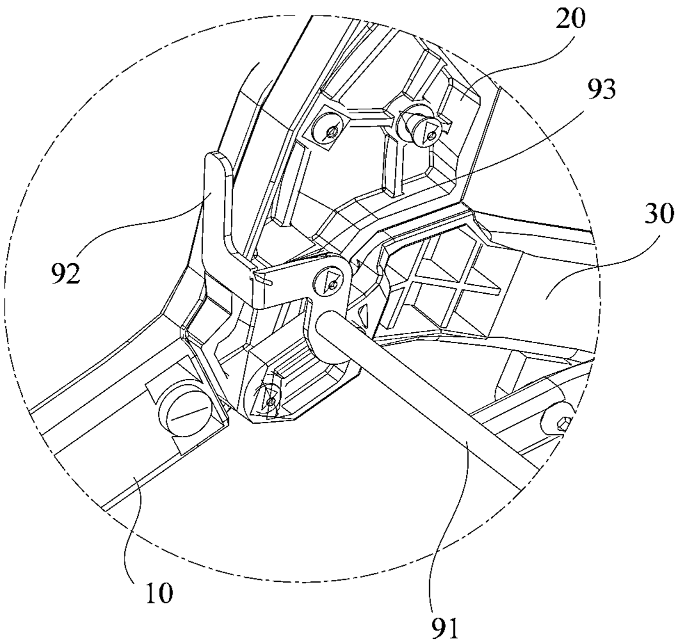
FIG. 11 is an enlarged schematic diagram of another view angle at position A in FIG. 8.

As shown in FIGS. 5 to 7, based on the above embodiments, the front support frame 10, the backrest bracket 20, the rear support frame 30 and the bracket connecting rod 40 of the first connecting rod mechanism mentioned above are sequentially hinged to form pivot points a, b, c, and d.

Specifically, in the first connecting rod mechanism, the end of the front support frame 10 away from the front wheels 11 is hinged with the second installation portion 23 of the backrest bracket 20 to form the pivot point a, and the second installation portion 23 of the backrest bracket 20 is hinged with the end of the rear support frame 30 away from the rear wheels 31 to form the pivot point b; the two ends of the bracket connecting rod 40 are respectively hinged with the rear support frame 30 and the front support frame 10 to form the pivot points c and d, and a distance relationship among respective pivot points a, b, c, and d satisfies that ab:bc:cd:da=1:1.1~1.2:2.4~3:2.4~2.8. In an implementation, the distance relationship among respective pivot points a, b, c, and d satisfies that ab:bc:cd:da=1:1.2:2.75:2.7.

In the second connecting rod mechanism, the front support frame 10, the seat connecting rod 50, the seat bracket 60, and the backrest bracket 20 are sequentially connected to form pivot points e, f, g, and a, and the pivot point g is located above the central plane of the seat bracket 60.

Specifically, in the second connecting rod mechanism, the seat connecting rod 50 is configured to connect the front support frame 10 and the seat bracket 60. One end of the seat connecting rod 50 is hinged with the front support frame 10 to form the pivot point e, the other end of the seat connecting rod 50 is hinged with the seat bracket 60 to form the pivot point f. An end of the seat bracket 60 away from the pivot point f is hinged with the second installation portion 23 of the backrest bracket 20 to form the pivot point g, the pivot point g being located above the central plane of the seat bracket 60; and the second installation portion 23 of the backrest bracket 20 is also hinged with the front support frame 10 to form the pivot point a. Furthermore, a distance relationship among the above-mentioned respective pivot points e, f, g, and a satisfies that ef:fg:ga:ae=1~1.8:2.8~4.8:1:2.2~3.2. In an implementation, the distance relationship among the above-mentioned respective pivot points e, f, g, and a satisfies that ef:fg:ga:ae=1.65:4.7:1:3.1.

With this arrangement, the pivot points in the first and second connecting rod mechanisms mentioned above in the embodiments of the present application meet the distance relationship mentioned above, not only realizing the follower folding of the seat bracket 60 during the folding and unfolding process of the entire collapsible wheelchair when the first connecting rod mechanism moves, but also realizing that when the collapsible wheelchair is in the folded state, the backrest bracket 20 can rotate to a horizontal state and remain parallel to the support plane supporting the collapsible wheelchair. Therefore, the folded collapsible wheelchair is integrally in a horizontal state and relatively flat, so the folded collapsible wheelchair is stable in terms of its gravity center and not easy to tilt, thereby improving the user experience.

Continuing to refer to FIG. 6, a vertical distance of the pivot point g relative to the central plane of the seat bracket 60 is X, and a vertical distance of the pivot point g relative to a central plane of the first installation portion 22 is Y, and X and Y meet that 60 mm≤x+y≤110 mm. For example, a value range of X is 10 mm≤X≤50 mm, and a value range of Y is 50 mm≤Y≤60 mm. With such arrangement, in the embodiment of the present application, when the collapsible wheelchair is in the folded state, the backrest bracket 20 and the seat bracket 60 can accommodate the seat cushion and the backrest cushion, avoiding the interference between the backrest bracket 20 and the seat bracket 60 during the folding process. When folding the collapsible wheelchair, there is no need to dismantle the seat cushion before folding, which improves the user experience.

In some embodiments, the seat bracket 60 is inclined relative to the support plane as a whole. A first end of the seat bracket 60 is a free end, and a second end of the seat bracket 60 is hinged with the second installation portion 23 of the backrest bracket 20 to form the pivot point g, and the pivot point g is located above the central plane of the seat bracket 60. A rear inclination angle of the first installation portion 22 of the backrest bracket 20 is $\alpha$, and a value range for $\alpha$ is 5° to 20°. The second end of the seat bracket 60 is set diagonally upwards relative to a horizontal support plane, and the formed elevation angle is $\beta$, and a value range for $\beta$ is 2° to 8°.

When folding the collapsible wheelchair, the backrest bracket 20 is rotated counterclockwise, and then the seat bracket 60 can follow therewith to rotate counterclockwise. When the backrest bracket 20 rotates counterclockwise by $90°+\alpha°$, the seat bracket 60 can rotate counterclockwise by the angle $\beta$, and the central plane of the seat bracket 60 is parallel to the horizontal support plane. That is, the central plane of the seat bracket 60 can be parallel to the central plane of the backrest bracket 20, both of which are in a horizontal state.

For example, in the present embodiment, the rear inclination angle of the first installation portion 22 of the backrest bracket 20 is 16°, and the elevation angle of the seat bracket 60 relative to the support plane is 4°. Then, when the backrest bracket 20 rotates counterclockwise by 106°, the seat bracket 60 can rotate counterclockwise by 4°, and the central plane of the seat bracket 60 can be parallel to the central plane of the backrest bracket 20, both of which are parallel to the horizontal support plane. With this arrangement, the backrest bracket 20 can fit snugly with the seat bracket 60, further enabling that when a collapsible wheelchair is in the folded state, it is integrally flatter, its gravity center is more stable, and it is less prone to tipping over, thereby enhancing the user experience.

Figure 4:
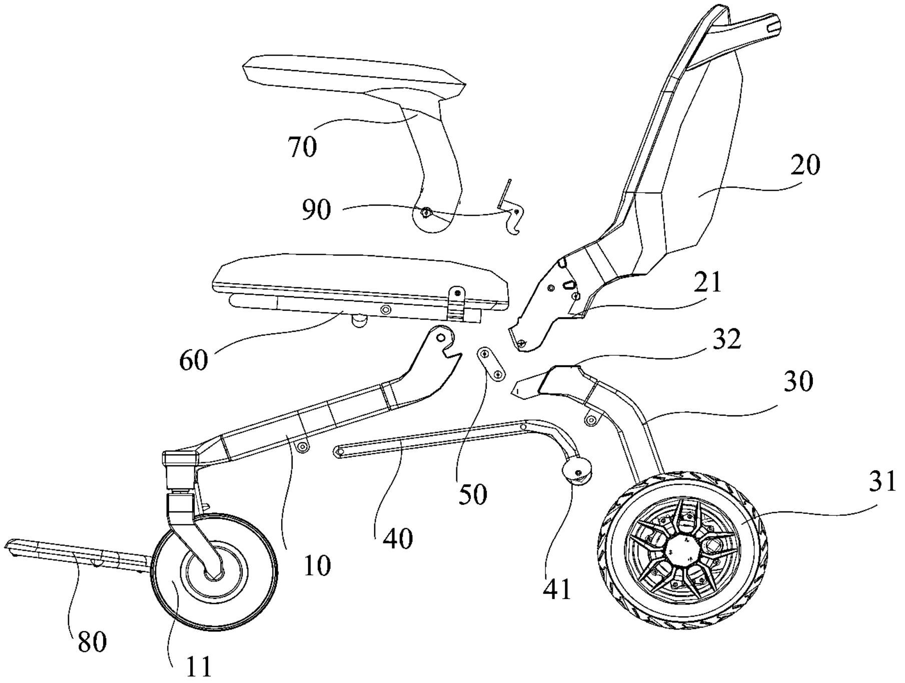
FIG. 4 is an exploded schematic diagram of the collapsible wheelchair provided by an embodiment of the present application.

As shown in FIG. 6, combined with FIG. 4, the wheel set of the collapsible wheelchair in the embodiment of the present application not only includes front wheels 11 and rear wheels 31, but also includes a support wheel 41 installed on the bracket connecting rod 40.

Specifically, the bracket connecting rod 40 is arranged between the front support frame 10 and the rear support frame 30, and the bracket connecting rod 40 includes a main body section 42 and an extension section 43. The main body section 42 is located between the front support frame 10 and the rear support frame 30, and the main body section 42 is hinged with the front support frame 10 to form the pivot point d, and the main body section 42 is hinged with the rear support frame 30 to form the pivot point c.

The extension section 43 and the main body section 42 form an integrated structure, and an angle formed between the extension section 43 and the main body section 42 is an obtuse angle. The extension section 43 is arranged on an outer side of the rear support frame 30 and extends diagonally downwards along the rear support frame 30. One end of the extension section 43 extends to the pivot point c, the other end of the extension section 43 is configured to install the support wheel 41, and the support wheel 41 can rotate relative to the bracket connecting rod 40. With this arrangement, when the collapsible wheelchair is in the folded state, the support wheel 41 can come into contact with the ground, thus the rear wheels 31, the support wheel 41 and the ground form a stable support plane, thereby improving the stability of the collapsible wheelchair in the folded state and preventing it from tipping over.

Furthermore, the angle between the main body section 42 and the extension section 43 is obtuse (>90°). In the folded state, the support wheel 41 is close to a tail portion of a wheelchair body (constraining a margin distance between an end point of the extension section 43 and the tail portion of the wheelchair body), making it convenient for the wheelchair to be towed in the folded state, and a towing handle is located at the front wheel bracket or the footrest. At the same time, the collapsible wheelchair can be arranged upright, using a structure near the pivot point b and the support wheel 41 as a support plane.

Specifically, when the collapsible wheelchair is placed upright, that is, when the collapsible wheelchair is in the folded state and perpendicular to the support plane, the support wheel 41, a part of the backrest bracket 20 near the pivot point b and/or a part of the rear support frame 30 near the pivot point b respectively abut against the support plane, in other words, the support wheel 41 and a part of the backrest bracket 20 arranged around the pivot point b and/or a part of the rear support frame 30 arranged around the pivot point b respectively abut against the support plane. This arrangement ensures the stability of the collapsible wheelchair when placed upright.

It should be noted that when the collapsible wheelchair is in the folded state and placed horizontally, its front wheels 11 are in contact with the ground, so that the front wheels 11, the rear wheels 31 and the support wheel 41 are in contact with the ground to form a stable support plane, which can further improve the stability of the collapsible wheelchair in the folded state.

In an implementation, the towing handle in an embodiment of the present application can be formed at the footrest. Specifically, the footrest 80 is arranged on the front support frame 10, and the footrest 80 can support the user's feet when the user sits in the collapsible wheelchair. The footrest 80 is foldable relative to the front support frame 10, and the footrest 80 can be unfolded when the collapsible wheelchair is unfolded; on the contrary, when the collapsible wheelchair is in the folded state, the footrest 80 can be folded. This arrangement can save the storage space occupied by the collapsible wheelchair in the folded state.

Figure 2:
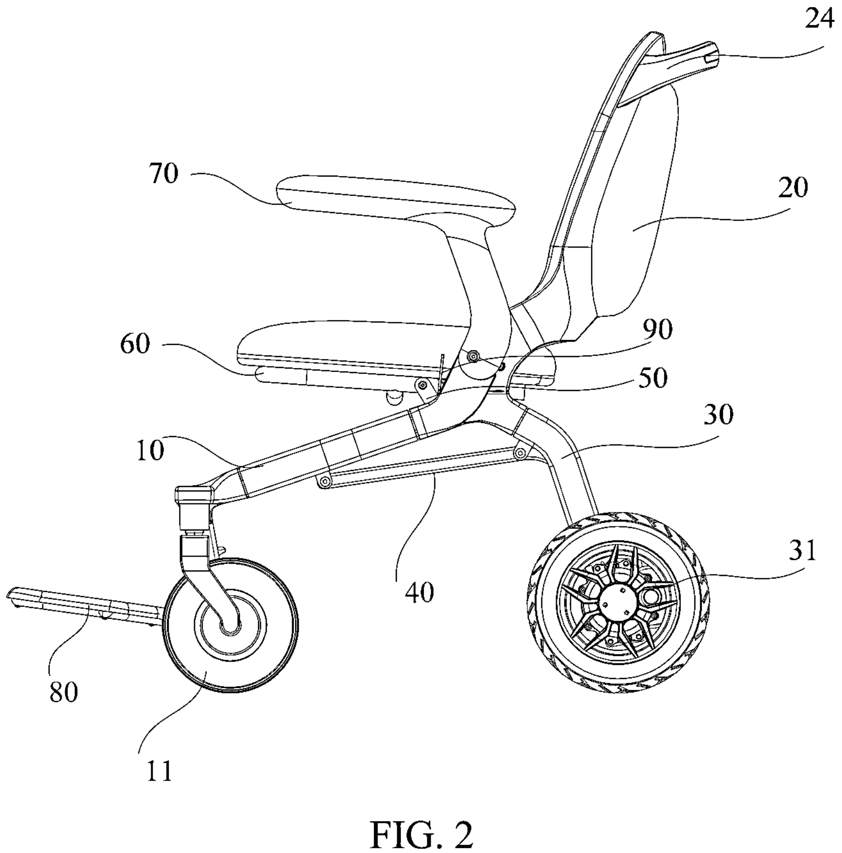
FIG. 2 is a schematic diagram of an unfolded state of the collapsible wheelchair provided by an embodiment of the present application.
Figure 3:
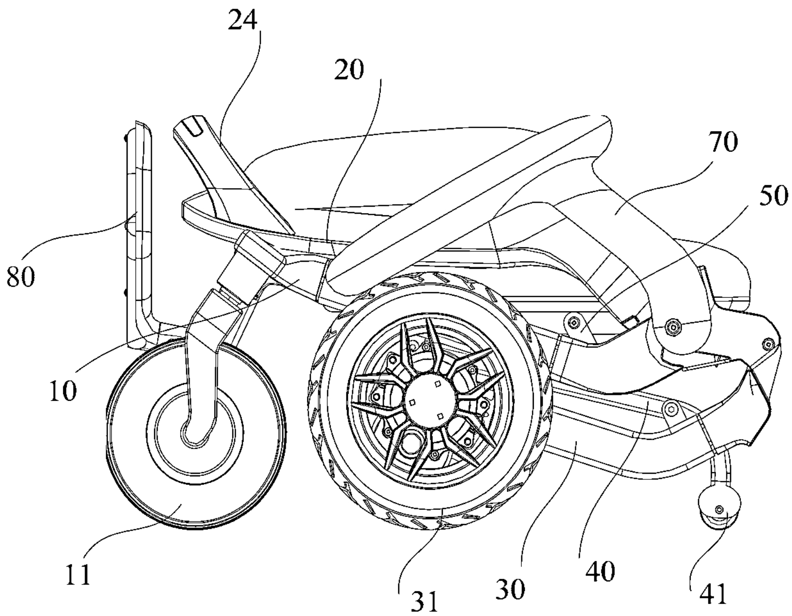
FIG. 3 is a schematic diagram of a folded state of the collapsible wheelchair provided by an embodiment of the present application.

Referring to FIGS. 1 and 2, when the collapsible wheelchair is in the unfolded state, the footrest 80 is folded outwards away from the front support frame 10 and is in the unfolded state, and in this state, the footrest 80 is approximately horizontal or has a certain inclination angle with respect to the ground. Referring to FIG. 3, when the collapsible wheelchair is in the folded state, the footrest 80 is folded towards a side of the front support frame 10 and is in the folded state, and in this state, the footrest 80 is approximately vertical or has a certain inclination angle with respect to the ground.

Further, the footrest 80 is provided with a through hole 81 penetrating therethrough to form a first grip portion on the footrest. According to a usage scenario of the first grip portion, the first grip portion can be defined as the above-mentioned towing handle, so as to facilitate towing the collapsible wheelchair in the folded state. And, when folding or unfolding the collapsible wheelchair, the first grip portion can be defined as a force applying portion or a force applying handle, so as to facilitate folding or unfolding the collapsible wheelchair.

Illustratively, the footrest includes a support portion 82 and a connection portion 83 which are arranged in an L-shape. The support portion 82 is configured to support the user's feet, and the through hole 81 is arranged on a side of the support portion 82 far away from the connection portion 83 and penetrates through the support portion 82. It should be noted that the through hole 81 is arranged near the edge of the support portion 82, and the through hole 81 can be a rectangular hole or the like, which is arranged in cooperation with the hands of the user, so that the user can grasp the through hole.

Referring to FIG. 1, the connection portion 83 may be disposed on a side of the support portion 82 and protrude from the support portion 82. The support portion 82 is configured to rotatably connect the footrest 80 to the front support frame 10, so that the footrest 80 can be folded relative to the front support frame 10 within a certain angle range. In this embodiment, the footrest 80 is rotatably connected to a recessed portion 12 of the front support frame 10.

For example, the front support frame 10 is provided with the recessed portion 12 near the footrest 80, and the recessed portion 12 is integrally U-shaped, that is, the front support frame 10 bends downward near the position of the footrest 80 to form the U-shaped recessed portion 12. The connection portion 83 can be configured as a U-shaped connecting arm, and the connecting arm is rotatably connected in the recessed portion 12.

On the basis of the above embodiments, the collapsible wheelchair provided by the embodiment of the present application is further provided with a grasping arm 24 on a back side of the backrest bracket 20, and a second grip portion is formed at the space between the grasping arm 24 and the backrest bracket 20. Accordingly, according to a usage scenario of the second grip portion, the second grip portion can be defined as the above-mentioned towing handle, so as to facilitate towing the collapsible wheelchair in the folded state. And, when folding or unfolding the collapsible wheelchair, the second grip portion can be defined as a force applying portion or a force applying handle, so as to facilitate folding or unfolding the collapsible wheelchair.

Specifically, the grasping arm 24 is integrally C-shaped or U-shaped, both ends of the grasping arm 24 are respectively connected to the back side of the backrest bracket 20, and a second grip portion is formed at the space between the grasping arm 24 and the backrest bracket 20. It can be understood that the grasping arm 24 is arranged in cooperation with the user's hands to facilitate the user to grasp and apply force.

Further, referring to FIG. 2, when the collapsible wheelchair is in the folded state, the first grip portion and the second grip portion approach each other. With this arrangement, the user can conveniently carry, tow, unfold or fold the collapsible wheelchair by using the first grip portion and the second grip portion.

As shown in FIGS. 8 to 11, and referring to FIG. 5, based on the above embodiments, in the collapsible wheelchair provided by an embodiment of the present application, the backrest bracket 20 and the rear support frame 30 have a locking structure. When the collapsible wheelchair is in the unfolded state, the backrest bracket 20 and the rear support frame 30 are mutually limited and supported by the locking structure, thereby forming a stable triangular structure of the pivot points a, c, and d.

Specifically, the locking structure is formed between the backrest bracket 20 and the rear support frame 30. The locking structure includes a first locking surface 21 and a second locking surface 32. A position of the backrest bracket 20 near the rear support frame 30 is provided with a concavity to form the first locking surface 21, that is, the surface on which the concavity is formed forms the first locking surface 21. An end of the rear support frame 30 near the backrest bracket 20 is provided with a protrusion, the protrusion is matched with the concavity and has a second locking surface 32 that is matched with the first locking surface 21. During the unfolding process of the collapsible wheelchair, when the backrest bracket 20 rotates in place, the protrusion can be embedded into the concavity, and the first locking surface 21 abuts against and fits snugly with the second locking surface 32, thereby achieving the positon limiting and support between the backrest bracket 20 and the rear support frame 30, preventing the backrest bracket 20 and the rear support frame 30 from rotating about the pivot point b in a face-to-face direction.

In order to improve the stability of the unfolded state of the collapsible wheelchair, the collapsible wheelchair provided by an embodiment of the present application further includes a locking hook mechanism 90 including a linkage rod 91 and at least one locking hook 92. The linkage rod 91 runs through a lower part of the seat bracket 60, and an end of the linkage rod 91 is fixed with a locking hook 92 which is rotatably connected to the backrest bracket 20.

The rear support frame 30 is provided with a retaining pin 33 matched with the locking hook 92. The locking hook 92 has a limiting groove 922 matched with the retaining pin 33. This limiting groove 922 can be engaged with the retaining pin 33. A torsion spring 93, which is configured to provide a locking force to the locking hook 92, is also provided between the rear support frame 30 and the locking hook 92, so as to keep the locking hook 92 on the backrest bracket 20.

When the collapsible wheelchair is unfolded in place, a back surface of the locking hook 92 first comes into contact with the retaining pin 33, and under a thrust of the rear support frame 30, the locking hook 92 can overcome the locking force of the torsion spring 93 and rotate clockwise, so that the retaining pin 33 can be caught into the limiting groove 922; at this time, the locking hook 92 rotates counterclockwise and is restored under the action of the torsion spring 93, and the bottom of the locking hook 92 abuts against the limit protrusion of the backrest bracket 20, thereby realizing constraints on the backrest bracket 20 and the rear support frame 30 to prevent the backrest bracket 20 and the rear support frame 30 from separating from each other around the pivot point b. At the same time, the backrest bracket and the rear support frame 30 are limited and supported through the locking structure, preventing the backrest bracket 20 and the rear support frame 30 from rotating about the pivot point b in the face-to-face direction. As a result, the backrest bracket 20 and the rear support frame 30 are completely constrained against each other. A stable triangular structure with the pivot points a, c, and d is formed in the first connecting rod mechanism.

Illustratively, the locking hook mechanism 90 provided by an embodiment of the present application includes a first locking hook and a second locking hook. The first locking hook and the second locking hook are symmetrically arranged at either ends of the linkage rod 91, and the first locking hook and the second locking hook are symmetrical components. Taking the first locking hook as an example, the specific structure thereof will be described.

The first locking hook includes a wrench 921 which is configured to apply a pressure to the first locking hook, to overcome a torsion force of the torsion spring 93, so that the first locking hook rotates relative to the backrest bracket 20. For example, if the wrench 921 is pressed down so that the first locking hook is rotated clockwise, the first locking hook will detach from the retaining pin 33, thereby releasing the position limiting between the rear support frame 30 and the backrest bracket 20, to fold the collapsible wheelchair.

A position of the backrest bracket 20 near the first locking hook is provided with a positioning protrusion which can be abutted against a bottom portion of the wrench 921. The torsion spring 93 provides an outward supporting force for the first locking hook to rotate counterclockwise. When the bottom portion of the wrench 921 is abutted against the positioning protrusion, the first locking hook rotates in place, and the limiting groove 922 of the first locking hook is engaged with the retaining pin 33 to complete the locking of the backrest bracket 20 and the rear wheel bracket.

It should be noted that the first and second locking hooks mentioned above can rotate synchronously. When the user operates the wrench 921 of any one locking hook 92, the locking and unlocking between the backrest bracket 20 and the rear support frame 30 can be completed, which can improve the user experience.

Each embodiment or implementation in this specification is described in a progressive way, and each embodiment focuses on the differences from other embodiments, so cross reference can be made for the same or similar parts between the embodiments.

It should be pointed out that the embodiments indicated by "one embodiment", "embodiment", "exemplary embodiment" and "some embodiments" mentioned in the specification may include specific features, structures or characteristics, but not every embodiment necessarily includes such specific features, structures or characteristics. Moreover, such phrases do not necessarily refer to the same embodiment. Furthermore, when a particular feature, structure or characteristic is described in connection with an embodiment, it is within the knowledge of those skilled in the art to realize such feature, structure or characteristic in connection with other embodiments that are explicitly or not explicitly described.

Generally speaking, terms should be understood at least in part by use in context. For example, depending at least in part on the context, the term "one or more" as used herein can be used to describe any singular feature, structure or characteristic, or can be used to describe a combination of plural features, structures or characteristics. Similarly, the term such as "a" or "an" can also be understood to convey singular usage or plural usage, at least in part according to the context.

It should be easily understood that "on . . . ", "above . . . " and "over . . . " in the present disclosure should be interpreted in the broadest way, so that "on . . . " not only means "directly on something" but also means "on something" with an intermediate feature or layer in between, and "above . . . " not only means "over something" but also means "above something" without an intermediate feature or layer in between (that is, directly on something).

Finally, it should be explained that the above embodiments are only used to illustrate the technical solution of the present application, but not to limit it. Although the present application has been described in detail with reference to the foregoing embodiments, it should be understood by those skilled in the art that the technical solution described in the foregoing embodiments can still be modified, or some or all of its technical features can be replaced by equivalents. However, these modifications or substitutions do not make the essence of the corresponding technical solutions deviate from the scope of the technical solutions of various embodiments of the present application.

What is claimed is:

1. A collapsible wheelchair, comprising a front support frame, a backrest bracket, a rear support frame, a bracket connecting rod, a seat bracket and a seat connecting rod;

wherein the front support frame, the backrest bracket, the rear support frame and the bracket connecting rod are hinged with each other to form a first connecting rod mechanism; wherein the bracket connecting rod is arranged between the rear support frame and the front support frame and the front support frame and the rear support frame are both hinged to the backrest bracket; the seat connecting rod is hinged with the front support frame and the seat bracket respectively; and the front support frame, the backrest bracket, the seat bracket and the seat connecting rod form a second connecting rod mechanism;

a hinge point of the backrest bracket and the seat bracket is located above a central plane of the seat bracket.

2. The collapsible wheelchair according to claim 1, wherein the front support frame, the backrest bracket, the rear support frame and the bracket connecting rod of the first connecting rod mechanism are hinged in turn to form pivot points a, b, c and d, and a distance relationship among the pivot points satisfies: ab:bc:cd:da=1:1.1~1.2:2.4~3:2.4~2.8;

the front support frame, the seat connecting rod, the seat bracket and the backrest bracket of the second connecting rod mechanism are connected in turn to form pivot points e, f, g and a, and the pivot point g is located above the central plane of the seat bracket;

a distance relationship among the pivot points satisfies: ef:fg:ga:ae=1~1.8:2.8~4.8:1:2.2~3.2.

3. The collapsible wheelchair according to claim 2, wherein in the first connecting rod mechanism, the distance relationship among the pivot points satisfies: ab:bc:cd:da=1:1.2:2.75:2.7.

4. The collapsible wheelchair according to claim 2, wherein in the second connecting rod mechanism, the distance relationship among the pivot points satisfies: ef:fg:ga:ae=1.65:4.7:1:3.1.

5. The collapsible wheelchair according to claim 2, wherein the backrest bracket is provided with a first installation portion configured to install a backrest cushion, and the first installation portion is inclined backwards along a first direction.

6. The collapsible wheelchair according to claim 5, wherein a vertical distance between the pivot point g and the central plane of the seat bracket is X, and a vertical distance between the pivot point g and a central plane of the first installation portion is Y, and X and Y satisfy that 60 mm≤X+Y≤110 mm.

7. The collapsible wheelchair according to claim 6, wherein the seat bracket is obliquely arranged relative to a support plane of a wheel set supporting the collapsible wheelchair, and an end of the seat bracket away from the pivot point g is inclined upwards;

the seat bracket is configured such that the seat bracket is rotatable counterclockwise when the first installation portion rotates counterclockwise to fold the collapsible wheelchair;

and when the collapsible wheelchair is in a folded state, the central plane of the seat bracket is parallel to the support plane.

8. The collapsible wheelchair according to claim 7, wherein an angle range of a back inclination angle of the first installation portion is 5°~20°;

an angle range of an inclination angle of the seat bracket is 2°~8°.

9. The collapsible wheelchair according to claim 1, wherein the collapsible wheelchair comprises front wheels, rear wheels and a support wheel;

the front wheels are installed on the front support frame, and the rear wheels are installed on the rear support frame;

the bracket connecting rod comprises a main body section and an extension section, wherein the main body section is arranged between the rear support frame and the front support frame, and the extension section is arranged laterally of the rear support frame;

the extension section is obliquely arranged downwards, and an included angle between the extension section and the main body section is an obtuse angle;

the support wheel is arranged at one end of the extension section away from the main body section, and the support wheel is configured such that when the collapsible wheelchair is in a folded state, both the support wheel and the rear wheels abut against the support plane.

10. The collapsible wheelchair according to claim 1, wherein the collapsible wheelchair comprises front wheels and rear wheels;

the front wheels are installed on the front support frame, and the rear wheels are installed on the rear support frame;

the bracket connecting rod comprises a main body section, wherein the main body section is arranged between the rear support frame and the front support frame, and the main body section is respectively hinged with the rear support frame and the front support frame.

11. The collapsible wheelchair according to claim 10, wherein the collapsible wheelchair further comprises a support wheel;

the bracket connecting rod further comprises an extension section, and the extension section is arranged outside the rear support frame;

the extension section is obliquely arranged downwards, and an included angle between the extension section and the main body section is an obtuse angle;

the support wheel is arranged at an end of the extension section far away from the main body section, and when the support wheel is configured such that the collapsible wheelchair is in a folded state and placed horizontally, both the support wheel and the rear wheels abut against the support plane; and when the support wheel is configured such that the collapsible wheelchair is in a folded state and is arranged perpendicular to the support plane, the support wheel, a part of the backrest bracket near the pivot point b and/or a part of the rear support frame near the pivot point b respectively abut against the support plane.

12. The collapsible wheelchair according to claim 10, wherein the collapsible wheelchair comprises a footrest, the footrest is arranged on the front support frame, and the footrest is configured to be foldable relative to the front support frame;

the footrest has a through hole penetrating therethrough to form a first grip portion, and when unfolding or folding the collapsible wheelchair, the first grip portion is configured as a force applying portion.

13. The collapsible wheelchair according to claim 12, wherein a side of the front support frame close to the footrest is provided with a U-shaped recessed portion;

the footrest comprises a support portion and a connection portion which are arranged in an L-shape, the connection portion is rotatably connected in the recessed portion, and the through hole penetrates through the support portion.

14. The collapsible wheelchair according to claim 10, wherein a back side of the backrest bracket is provided with a grasping arm, two ends of the grasping arm are respectively connected with the back side of the backrest bracket, and a second grip portion is formed between the grasping arm and the backrest bracket;

when unfolding or folding the collapsible wheelchair, the second grip portion is configured as a force applying portion; and when the collapsible wheelchair is in a folded state, the second grip portion and the first grip portion approach each other.

15. The collapsible wheelchair according to claim 1, further comprising: a locking hook mechanism;

wherein the locking hook mechanism comprises a linkage rod and at least one locking hook, and the locking hook is arranged at an end of the linkage rod; the locking hook is rotatably connected to the backrest bracket, and a torsion spring is arranged between the locking hook and the backrest bracket, and the torsion spring is configured to provide a locking force to the locking hook;

the rear support frame is provided with a retaining pin matched with the locking hook, and the locking hook is provided with a limiting groove matched with the retaining pin, and the locking hook is clamped to the retaining pin through the limiting groove.

16. The collapsible wheelchair according to claim 15, wherein the locking hook mechanism comprises two locking hooks, and the two locking hooks are symmetrically arranged at either ends of the linkage rod;

the locking hook is provided with a wrench, and the backrest bracket is provided with a positioning protrusion, and the wrench is configured such that when the wrench abuts against the positioning protrusion, the limiting groove of the locking hook is clamped to the retaining pin.

* * * * *